June 19, 1951  H. T. TREACE  2,557,364
SURGICAL SAW BLADE
Filed June 15, 1948
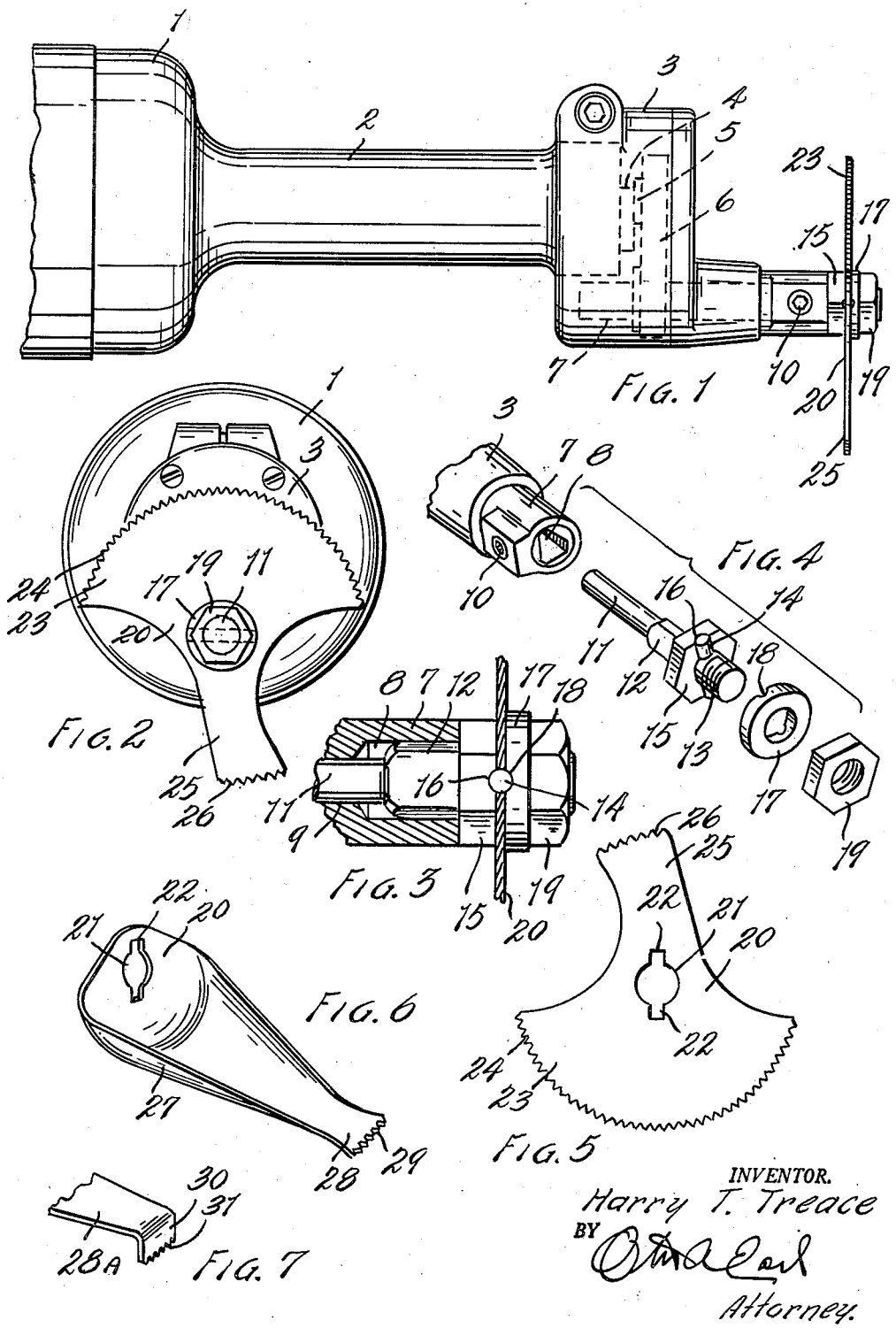
INVENTOR.
Harry T. Treace
BY
Attorney.

Patented June 19, 1951

2,557,364

UNITED STATES PATENT OFFICE 2,557,364

SURGICAL SAW BLADE

Harry Tillson Treace, Kalamazoo, Mich., assignor to Orthopedic Frame Co., Kalamazoo, Mich.

Application June 15, 1948, Serial No. 33,145

3 Claims. (Cl. 128—317)

This invention relates to improvements in surgical saw blade.

The principal objects of this invention are:

First, to provide saw blades to be used by a surgeon in cutting bone which blades are particularly adapted to facilitate rapid and accurate cutting of the bone along closely defined lines as required by the delicacy of surgical operations.

Second, to provide saw blades for the use of surgeons which are easily manipulated in various positions.

Third, to provide a mounting for surgical saw blades which provides a positive driving connection between the blade and an oscillating shaft.

Other objects pertaining to the details of my saw blades and mounting will be apparent from a consideration of the following description and claims.

The drawings, of which there is one sheet, illustrate a preferred form of the blade mounting and three modified forms of saw blades.

Fig. 1 is a fragmentary side elevational view of a power driven saw mechanism with one of my blades mounted thereon.

Fig. 2 is an end elevational view of the blade and driving mechanism illustrated in Fig. 1.

Fig. 3 is an enlarged fragmentary cross sectional view through the coupling connection of the saw blade.

Fig. 4 is a fragmentary exploded perspective view of the mounting structure for the saw blade.

Fig. 5 is an elevational view of a first form of saw blade.

Fig. 6 is a perspective view of a second form of saw blade.

Fig. 7 is a fragmentary perspective view of the cutting end of a third form of saw blade.

The driving mechanism illustrated in Figs. 1 and 2 includes a sealed housing 1 for an electric motor, the housing being provided with a forwardly extending neck 2 connected to the driving head 3. The head 3 encloses the forward end of a drive shaft 4 having an eccentric 5 mounted thereon. The eccentric is rotatable in a slot in the oscillating lever 6 and the lever is secured to the oscillating shaft 7 journaled in the head 3. The driving mechanism thus briefly described is more particularly described and claimed in Patent No. 2,427,580, issued to Homer H. Stryker for a Cast Cutter.

The forward end of the oscillating shaft 7 is axially recessed in a generally triangular cavity 8 merging into the cylindrical bore 9. A set screw 10 is provided in one side of the shaft to extend through one of the flat surfaces of the cavity 8. The shaft 7 is thus adapted to receive the spindle 11 having a cylindrical inner end and triangular center portion 12. The outer end of the spindle 11 is threaded, as at 13, and transversely bored for receiving the driving pin 14. The set screw 10 is operative to positively wedge the triangular center portion 12 in the triangular cavity 8. An inner nut 15 is threaded on the end of the spindle against the triangular portion 12 and is provided with a half round transverse groove 16 on its forward face adapted to receive the rear side of the pin 14. A lock washer 17 having a half round groove 18 in its rear face is adapted to fit over the threaded end of the spindle and be held in place by the locking bolt 19.

Each of the saw blades is provided with a flat central portion 20 defining an aperture 21 adapted to fit over the threaded spindle 13 and notched, as at 22, to engage the ends of the driving pin 14. With the saw blades positioned between the inner nut 15 and the lock washer 17 the saw will be positively oscillated with the spindle 11 and oscillating shaft 7. Since the shaft 7 will be oscillated at high speed it is important that there be no lost motion or play between the saw blade and the spindle 11.

A first form of saw blade illustrated in Figs. 1, 2 and 5 consists of a flat piece of metal having a relatively wide segment shaped portion 23 provided with the teeth 24 along the edge thereof. This portion of the blade is adapted for making relatively long cuts, the depth of the cut being determined by the manipulation of the saw. Extending from the opposite side of the central portion 20 and slightly at an angle with respect to the center line of the wide portion 23 is a narrow radial arm 25 having the saw teeth 26 formed in the outer edge thereof. The arm 25 is co-planar with the semi-circular portion 23 and is preferably but not necessarily of the same radial dimension. This narrow arm is for making narrow cuts, the depth of which is also controlled by manipulation of the saw.

The form of saw blade illustrated in Fig. 6 consists of an axially extending portion 27 which is connected at its inner end to the central portion 20 and disposed along a cylindrical surface coaxial with the spindle aperture 21. The edges of the axial portion 27 converge outwardly of the blade and terminate in a generally flat straight edge portion 28 having the saw teeth 29 formed on the end thereof. The saw teeth 29 are adapted to oscillate about the axis of the spindle and make a cut parallel to the axis of the spindle. Due to the arc of oscillation of the oscillating shaft 7 the cut made by the saw teeth 29 will be approximately straight and can be made to any desired depth depending upon the manipulation of the saw. The cut made by the teeth 29 will be very similar to the cut made by the teeth 26 in the first form of blade but will be made by holding the housing 1 in a different position displaced approximately 90° from the position shown in Fig. 1. A surgeon performing an operation may find it more expedient to use the saw blade shown in Fig. 6 in one instance and to use the blade shown in Fig. 1 in another instance.

The third form of saw blade illustrated in Fig. 7 is substantially the same as that shown in Fig. 6 except that the narrow forward end portion 28—A is bent at right angles outwardly away from the axis of oscillation of the blade, as at 30, and the saw teeth 31 thus lie in a plane transverse to the axis of oscillation of the blade. The blade shown in Fig. 7 will make a narrow cut, the depth of which is limited by the length of the out-turned end portion 30. The housing and driving mechanism will be held generally parallel to the surface being sawed in much the same manner as when using the blade illustrated in Fig. 1.

All forms of my saw blade are positively connected to the driving mechanism and adapted to cut with an oscillating motion. The different shapes of the various forms permit the driving mechanism to be held in a variety of positions for the convenience of the surgeon so that the surgeon can concentrate more fully on the operation being performed.

I have thus described a highly practical embodiment of my saw mounting and three useful forms of my saw blades so that others can reproduce the same without further disclosure.

Having thus described my invention, what I claim as new and desire to secure by Letters Patent is:

1. A surgical saw blade comprising a flat central portion defining a spindle receiving aperture, and an axially extending portion joined with the edge of said central portion and lying along a segment of a generally cylindrical surface co-axial with said aperture, the outer end of said axially extending portion having teeth formed in the edge thereof to cut in a plane normal to said central portion.

2. A surgical saw blade comprising a flat central portion defining a spindle receiving aperture, and an axially extending portion joined with the edge of said central portion and lying along a segment of a generally cylindrical surface co-axial with said aperture, the outer end of said axially extending portion having teeth formed in the edge thereof.

3. A surgical saw blade comprising a flat central portion defining a spindle receiving aperture, and an axially extending portion joined with the edge of said central portion and lying along a segment of a generally cylindrical surface co-axial with said aperture, the outer end of said axially extending portion being turned laterally outwardly and having teeth formed in the edge thereof to cut in a plane parallel to said central portion.

HARRY TILLSON TREACE.

REFERENCES CITED

The following references are of record in the file of this patent:

UNITED STATES PATENTS

| Number | Name | Date |
|---|---|---|
| 2,427,580 | Stryker | Sept. 16, 1947 |
| 2,435,863 | Wydro | Feb. 10, 1948 |